United States Patent
Fukushima

(10) Patent No.: US 11,250,301 B2
(45) Date of Patent: Feb. 15, 2022

(54) IMAGE PROCESSING APPARATUS, IMAGE PRINTING APPARATUS, AND IMAGE PROCESSING METHOD WITH STORAGE OF TABLE DATA INCLUDING FIRST ADDRESS OF FIRST CHANNEL BUFFER AND SECOND CHANNEL BUFFER

(71) Applicant: CANON KABUSHIKI KAISHA, Tokyo (JP)

(72) Inventor: Kentaro Fukushima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/942,011

(22) Filed: Jul. 29, 2020

(65) Prior Publication Data

US 2021/0042593 A1 Feb. 11, 2021

(30) Foreign Application Priority Data

Aug. 9, 2019 (JP) .............................. JP2019-147535

(51) Int. Cl.
*G06K 15/02* (2006.01)
*G06K 15/10* (2006.01)

(52) U.S. Cl.
CPC ....... *G06K 15/1805* (2013.01); *G06K 15/102* (2013.01); *G06K 15/1817* (2013.01)

(58) Field of Classification Search
None
See application file for complete search history.

(56) References Cited

U.S. PATENT DOCUMENTS

| | | | | |
|---|---|---|---|---|
| 5,130,726 A * | 7/1992 | Fukushima | ............ | B41J 11/002 347/102 |
| 5,997,122 A * | 12/1999 | Moriyama | ............. | B41J 2/2128 347/11 |
| 6,958,763 B2 | 10/2005 | Uemura | | |
| 8,587,804 B2 * | 11/2013 | Inada | .................. | G06K 15/1809 358/1.15 |
| 2002/0180851 A1 * | 12/2002 | Saruta | .................. | B41J 2/17566 347/86 |
| 2004/0067085 A1 * | 4/2004 | Uemura | ............. | G06K 15/1247 400/118.2 |
| 2006/0256146 A1 * | 11/2006 | Usami | .................... | B41J 3/4071 347/2 |

(Continued)

FOREIGN PATENT DOCUMENTS

JP 2004-122562 A 4/2004

*Primary Examiner* — Mohammad H Ghayour
*Assistant Examiner* — Pawan Dhingra
(74) *Attorney, Agent, or Firm* — Venable LLP

(57) ABSTRACT

To provide an image processing apparatus capable of associating print data with channels with a simple configuration and transferring the print data to an appropriate print head, an image processing apparatus stores print data corresponding to each ink in a data buffer in association with ink information indicating each ink. The image processing apparatus includes a table retention unit which stores an address of a channel buffer associated with each of a plurality of print heads in association with the ink information, and transfers each print data to an address associated with the ink information. The image processing apparatus can rewrite an association between the addresses and the ink information stored in the table retention unit.

10 Claims, 13 Drawing Sheets

| Color | Address | Channel |
|---|---|---|
| C | 0x00000 | Ch1 |
| M | 0x00005 | Ch2 |
| Y | 0x00010 | Ch3 |

(56) References Cited

U.S. PATENT DOCUMENTS

2010/0214606 A1\* 8/2010 Kato .................... H04N 1/6033
 358/1.15
2016/0173728 A1\* 6/2016 Kasuya .............. H04N 1/33376
 358/1.14

\* cited by examiner

| Color | Address | Channel |
|-------|---------|---------|
| C     | 0x00000 | Ch1     |
| M     | 0x00005 | Ch2     |
| Y     | 0x00010 | Ch3     |

| Color | Address | Channel |
|---|---|---|
| C | 0x00000 | Ch1 |
| M | 0x00005 | Ch2 |
| Y | 0x00010 | Ch3 |
| BK | 0x00015 | Ch4 |

| Color | Address | Device | Channel |
|---|---|---|---|
| C | 0x00000 | A | Ch1 |
| M | 0x00005 | A | Ch2 |
| Y | 0x00010 | B | Ch3 |

| Color | Address | Channel |
|---|---|---|
| X | 0x00000 | Ch1 |
| Y | 0x00005 | Ch2 |
| Z | 0x00010 | Ch3 |

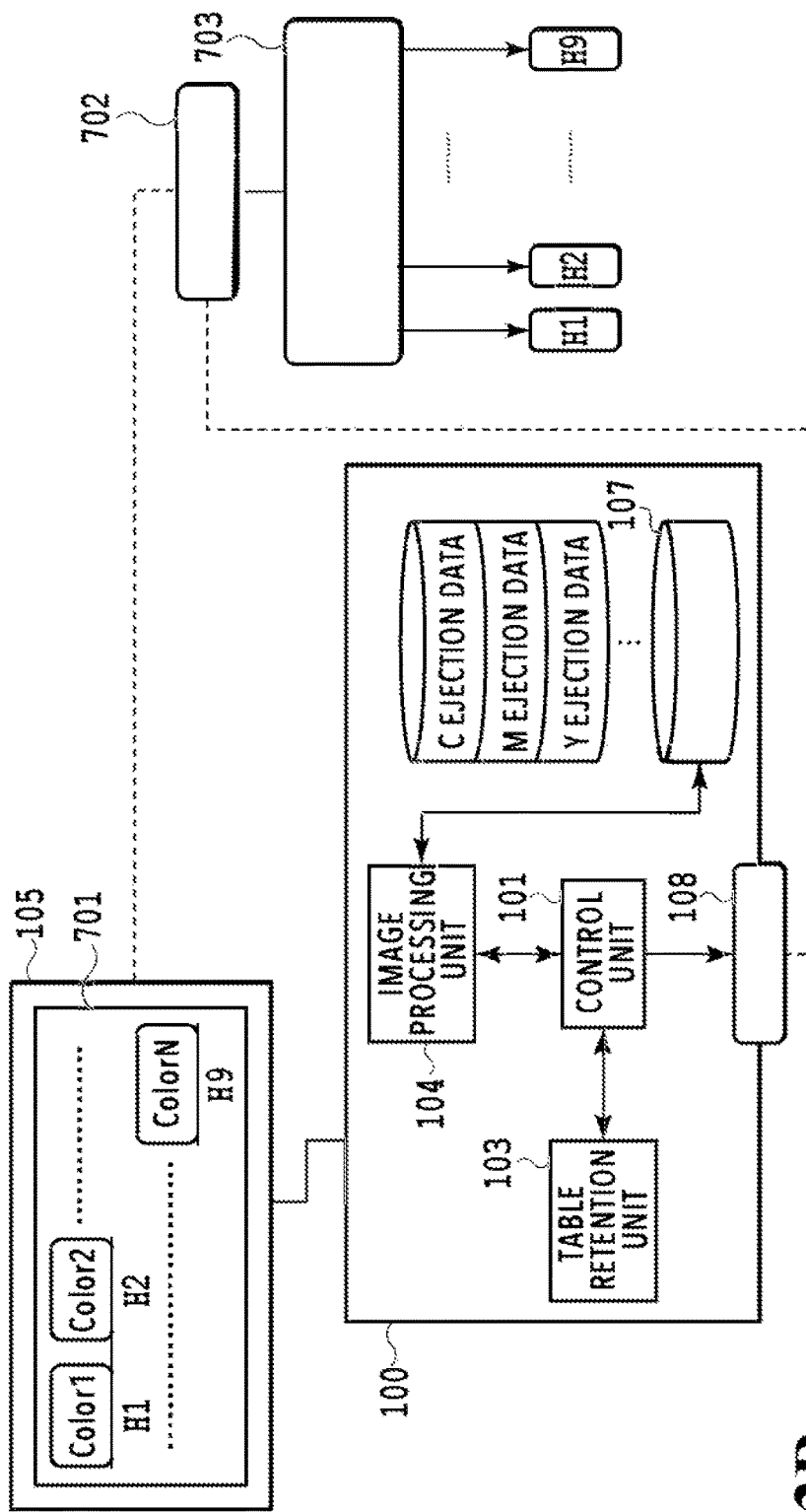

IMAGE PROCESSING APPARATUS, IMAGE PRINTING APPARATUS, AND IMAGE PROCESSING METHOD WITH STORAGE OF TABLE DATA INCLUDING FIRST ADDRESS OF FIRST CHANNEL BUFFER AND SECOND CHANNEL BUFFER

BACKGROUND OF THE INVENTION

Field of the Invention

The present invention relates to an image processing apparatus, an image printing apparatus, and an image processing method for transferring print data associated with each of a plurality of print heads and printing an image.

Description of the Related Art

In an image printing apparatus which prints an image using a plurality of print heads, a drive unit of the print heads drives each print head at a timing based on the arrangement of the print heads and prints an image on a print medium. At this time, print data unique to each print head to be printed by each print head is transferred from a unit in which the print data is generated to the drive unit via a channel associated with each print head.

Japanese Patent Laid-Open No. 2004-122562 discloses that a look-up table (LUT) for associating a line buffer accumulating print data with a channel buffer is prepared such that a destination channel buffer of each print data can be switched. According to Japanese Patent Laid-Open No. 2004-122562, even if the arrangement order of main scan lines (print heads) or the number of main scan lines in use is changed, print data to be printed by each main scan line can be appropriately transferred to each print head by referring to a corresponding look-up table.

However, in the configuration disclosed in Japanese Patent Laid-Open No. 2004-122562, the look-up table associating print data with channels needs to be prepared in advance according to the mode of switching. Accordingly, it is necessary to prepare a memory for storing tables corresponding to the modes of switching and a component for controlling switching of channel buffers, which may lead to an increase in cost.

Further, in the configuration disclosed in Japanese Patent Laid-Open No. 2004-122562, the association between print data and destination channel buffers is limited to the range of look-up tables prepared in advance. Accordingly, the configuration disclosed in Japanese Patent Laid-Open No. 2004-122562 often cannot sufficiently deal with the recent situation where there are various types of inks in use and print products and a printing apparatus is required to have a diversity of association between print data and channels.

SUMMARY OF THE INVENTION

The present invention has been accomplished in order to solve the above problem. Thus, the object of the present invention is to associate print data with channels with a simple configuration and transfer print data to an appropriate print head even in a case where the number or arrangement of print heads is variously changed.

In a first aspect of the present invention, there is provided an image processing apparatus configured to perform image processing for printing an image by ejecting different inks from a plurality of print heads, the image processing apparatus comprising: a data buffer configured to store print data corresponding to each ink in association with ink information indicating each ink; a storage unit configured to store an address of a channel buffer associated with each of the print heads in association with the ink information; a transfer unit configured to transfer each of the print data stored in the data buffer in association with the ink information to an address associated with the ink information in the storage unit; and a rewriting unit configured to rewrite an association between the addresses and the ink information in the storage unit.

In a second aspect of the present invention, there is provided an image printing apparatus comprising a plurality of print heads and configured to print an image by ejecting different inks from the respective print heads, the image printing apparatus comprising: a data buffer configured to store print data corresponding to each ink in association with ink information indicating each ink; a storage unit configured to store an address of a channel buffer associated with each of the print heads in association with the ink information; a transfer unit configured to transfer each of the print data stored in the data buffer in association with the ink information to an address associated with the ink information in the storage unit; a drive unit configured to cause each of the print heads to eject ink by driving each of the print heads according to the print data transferred to the corresponding channel buffer; and a rewriting unit configured to rewrite an association between the addresses and the ink information in the storage unit.

In a third aspect of the present invention, there is provided an image processing method of performing image processing for printing an image by ejecting different inks from a plurality of print heads, the image processing method comprising: a step of storing, in a data buffer, print data corresponding to each ink in association with ink information indicating each ink; an acquisition step of acquiring, from a storage unit which stores an address of a channel buffer associated with each of the print heads in association with the ink information, the address associated with each of the ink information; a transfer step of transferring each of the print data stored in the data buffer in association with the ink information to the address acquired in the acquisition step; and a rewriting step of rewriting an association between the addresses and the ink information in the storage unit.

Further features of the present invention will become apparent from the following description of exemplary embodiments with reference to the attached drawings.

BRIEF DESCRIPTION OF THE DRAWINGS

FIGS. 13A and 13B are diagrams showing a situation where settings received via a UI are reflected on a destination designation table.

DESCRIPTION OF THE EMBODIMENTS

Image Printing Apparatus

Figure 1:
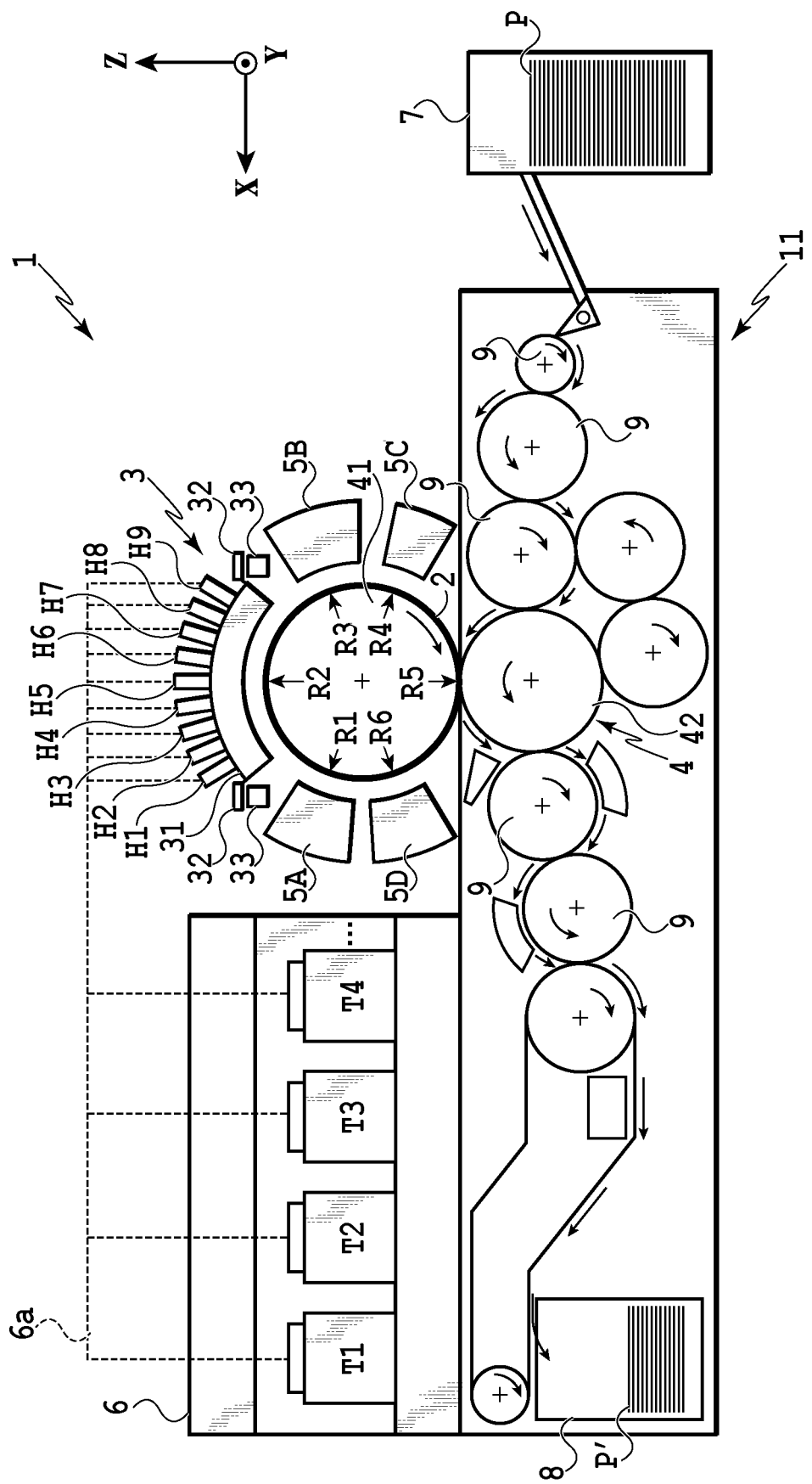
FIG. 1 is a schematic configuration diagram of an image printing apparatus.

FIG. 1 is a schematic configuration diagram of an image printing apparatus 1 according to an embodiment of the present invention. In the drawings, an X direction indicates a substantial conveyance direction of a print medium P, a Y direction indicates a width direction of the print medium P, and a Z direction indicates a vertical upward direction. The image printing apparatus 1 is a sheet-fed inkjet printer which produces a print product P' by transferring an ink image to the print medium P via a transfer body 2.

The image printing apparatus 1 mainly includes a print unit 3, a transfer unit 4, peripheral units 5A to 5D, a conveying unit 11, and a supply unit 6.

Figure 2:
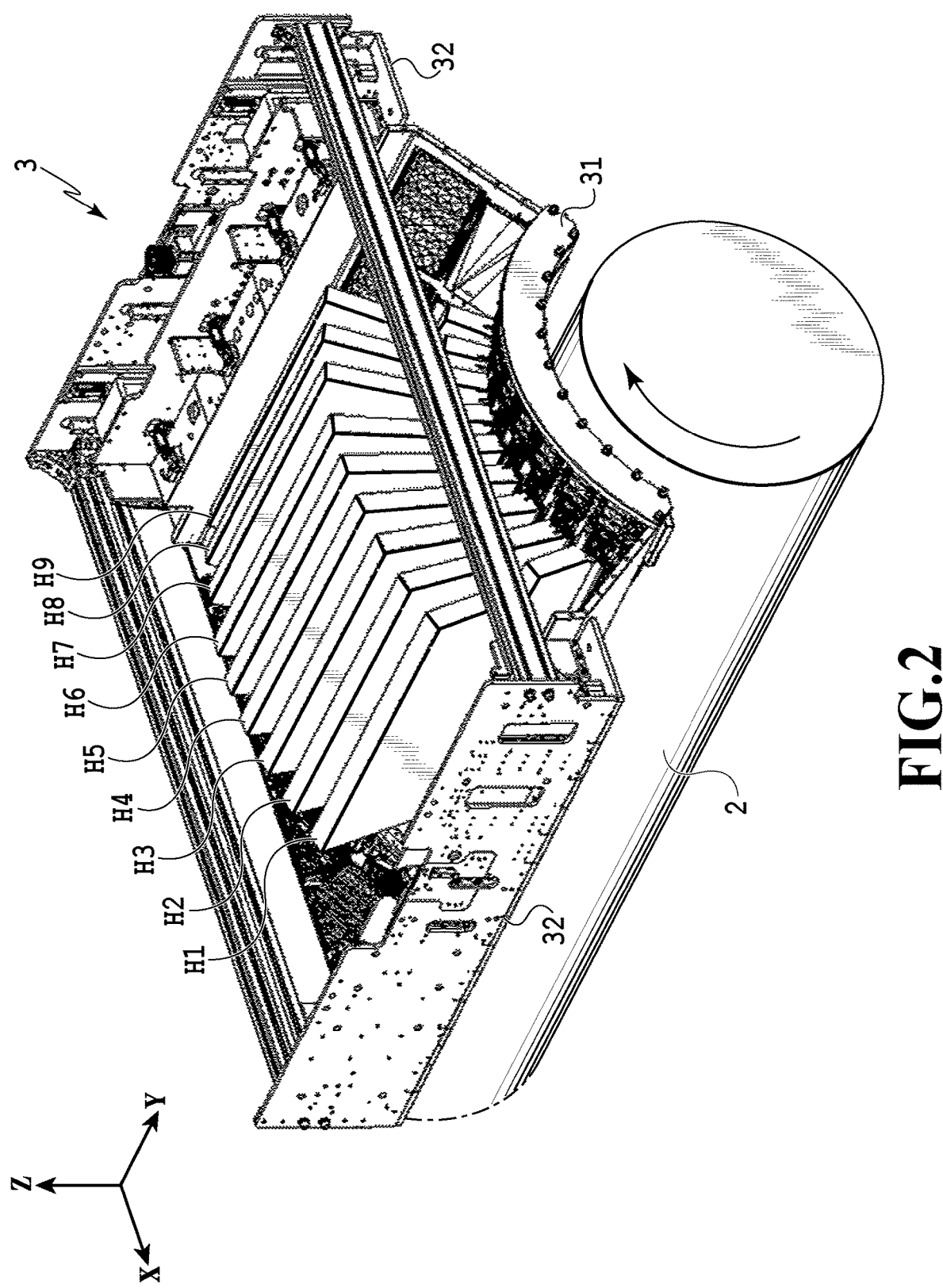
FIG. 2 is an enlarged perspective view of a print unit.

FIG. 2 is an enlarged perspective view of the print unit 3. A carriage 31 having a circular arc configuration is arranged along an outer periphery of the transfer body 2 and radially supports print heads H1 to H9. The bottom surface of each of the print heads H1 to H9 is provided with ejection openings for ejecting ink arrayed in the Y direction by a number corresponding to the width of the print medium P. The positions of the print heads H1 to H9 are adjusted such that ejection opening surfaces on which the ejection openings are arrayed are located at a predetermined interval (for example, several millimeters) from the surface of the transfer body 2. The print heads H1 to H9 are supplied with inks stored in tanks T1 to T9 provided in the supply unit 6, respectively, through supply tubes 6a (see FIG. 1).

In printing operation, the transfer body 2 rotates clockwise in the drawing at a predetermined speed and each of the print heads H1 to H9 ejects ink at a timing according to the rotation speed based on corresponding ejection data. That is, in the case of applying ink to the same position on the transfer body 2, the print head H2 ejects ink at a timing later than the print head H1 by a time according to the rotation speed of the transfer body 2, and the print head H3 ejects ink at a further later timing. This ejection operation forms an ink image on the transfer body 2 according to ejection data. In the present embodiment, nine print heads H1 to H9 are shown as an example. However, the number of print heads mounted on the carriage 31 may be increased or reduced. In the following description, the print heads H1 to H9 are simply referred to as print heads H if there is no need to identify them.

Inside each ejection opening, there is provided an ejection element which generates energy for ink ejection. The ejection element may be an element that ejects ink by causing film boiling in ink using an electrothermal transducer and forming bubbles, an element that ejects ink using an electromechanical transducer, an element that ejects ink using static electricity, or the like. From the viewpoint of high-speed and high-density printing, it is preferable to use an ejection element using an electrothermal transducer.

In the present embodiment, although not all the print heads H should necessarily be used, it is assumed that the print heads H in use eject different types of inks. The different types of inks are, for example, inks different in type or concentration of coloring material such as a yellow ink, magenta ink, cyan ink, light magenta ink, light cyan ink, black ink, and gray ink. Some of the inks in use may be ink not including coloring material (such as transparent ink). Although the ingredients of the inks are not particularly limited, it is assumed in the present embodiment that aqueous pigment inks containing pigment as coloring material, water, and resin are used.

Both sides of the carriage 31 in the X direction are provided with sliding members 32. The sliding members 32 are put on rail-shaped guiding members 33 extending in the Y direction (see FIG. 1) such that the entire print unit 3 including the carriage 31 and the print heads H1 to H9 is horizontally movable in the Y direction along the guiding members 33.

Figure 3:
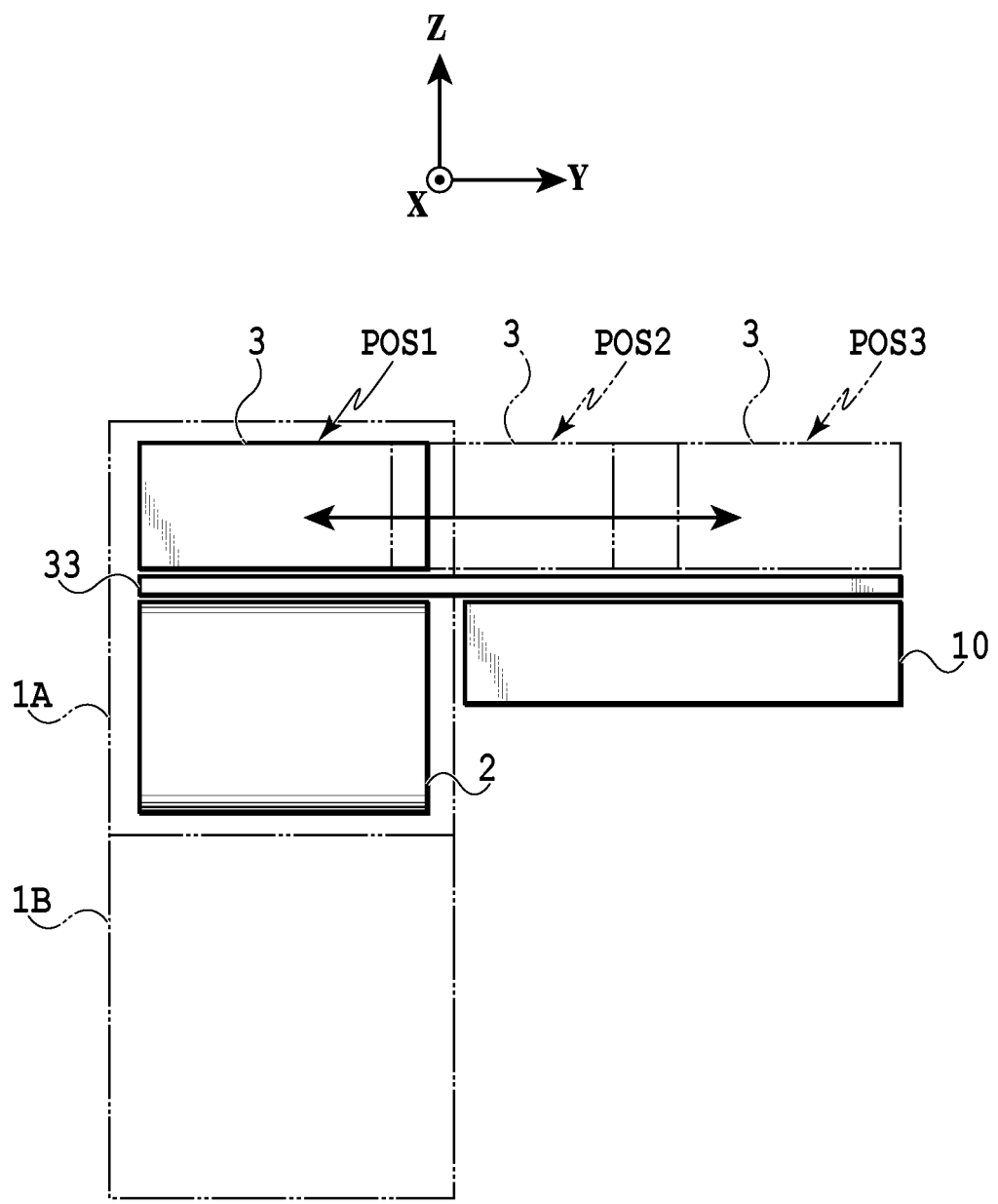
FIG. 3 is a diagram showing the movement of the print unit.

FIG. 3 is a diagram showing the movement of the print unit 3. The print unit 3 is movable in ±Y directions between a print operation position POS1 and a recovery operation position POS3. In the print operation position POS1, the print unit 3 can eject ink to the transfer body 2 according to ejection data. In the recovery operation position POS3, the print unit 3 can be subjected to recovery processing by a recovery unit 10. The recovery processing is processing for maintaining or recovering ejection performance of the print heads H. The recovery unit 10 comprises a cap mechanism for capping the ejection opening surfaces of the print heads H, a wiper mechanism for wiping the ejection opening surfaces, and a suction mechanism for negative pressure suction of ink inside the print heads H from the ejection opening surfaces.

The print unit 3 may perform preliminary ejection operation for the recovery unit 10 in a middle position POS2 in the middle of movement from the print operation position POS1 to the recovery operation position POS3 or from the recovery operation position POS3 to the print operation position POS1.

Returning to FIG. 1, in the conveying unit 11, print media P stacked on a sheet feeding unit 7 are fed to the apparatus body one by one according to a print command, conveyed along a plurality of conveying rollers 9, and then sent to the transfer unit 4 including a transfer cylinder 41, the transfer body 2, and an impression cylinder 42.

The print medium P conveyed to the transfer unit 4 is wound around the impression cylinder 42 rotating counterclockwise in the drawing. The impression cylinder 42 rotating counterclockwise and the transfer cylinder 41 rotating clockwise rotate while contacting each other at a nipping portion. An ink image formed on the transfer body 2 provided on the outer periphery of the transfer cylinder 41 is transferred from the transfer body 2 to the print medium P at the nipping portion. The print medium P to which the ink image is transferred becomes a print product P'. After being conveyed in the X direction by the conveying rollers 9, the print product P' is collected to a sheet collection unit 8.

The transfer body 2 is provided continuously or intermittently in the circumferential direction on the outer periphery of the axially rotating transfer cylinder 41. In a case where the transfer body 2 is provided continuously, the transfer body 2 is formed into an endless belt. In a case where the transfer body 2 is provided intermittently, the transfer body 2 is formed into a plurality of segments each having a shape of a belt with ends. In this case, each segment can be arranged like an arc at equal pitch on the outer periphery of the transfer cylinder 41.

The rotation of the transfer cylinder 41 cyclically moves the transfer body 2 on a circular orbit. According to the rotation phase of the transfer cylinder 41, the position of the transfer body 2 can be classified into an ejection preprocessing region R1, an ejection region R2, ejection postprocessing regions R3 and R4, a transfer region R5, and a transfer postprocessing region R6. The transfer body 2 cyclically passes through these regions.

The ejection preprocessing region R1 is a region in which the peripheral unit 5A performs preprocessing for the transfer body 2 before application of ink by the print unit 3. In the present embodiment, the peripheral unit 5A applies a reaction liquid to the transfer body 2 located in the ejection preprocessing region R1.

The ejection region R2 is a region in which the print unit 3 applies ink to the transfer body 2 after the preprocessing to form an ink image.

The ejection postprocessing regions R3 and R4 are regions in which the peripheral units 5B and 5C perform postprocessing for the transfer body 2 after the formation of the ink image by the print unit 3. In the present embodiment, the peripheral unit 5B absorbs an excess liquid component from the ink image formed on the transfer body 2. The peripheral unit 5C performs heating processing for the transfer body 2 located in the ejection postprocessing region R4.

The transfer region R5 is a region in which the ink image on the transfer body 2 is transferred to the print medium P. The transfer postprocessing region R6 is a region in which the peripheral unit 5D performs postprocessing for the transfer body 2 after the transfer (removal) of the ink image. In the present embodiment, the peripheral unit 5D performs cleaning processing for the transfer body 2 located in the transfer postprocessing region R6.

The ejection region R2 has a sufficient section for receiving ink ejected from the print heads H. Each of the other regions R1 and R3 to R6 has a section narrower than the ejection region R2. As compared with a clock face, in the drawing, the ejection preprocessing region R1 is located at about the 10 o'clock position, the ejection region R2 is a range between about the 11 and 1 o'clock positions, the ejection postprocessing region R3 is located at about the 2 o'clock position, the ejection postprocessing region R4 is located at about the 4 o'clock position, the transfer region R5 is located at about the 6 o'clock position, and the transfer postprocessing region R6 is located at about the 8 o'clock position.

Control Configuration

Figure 4:
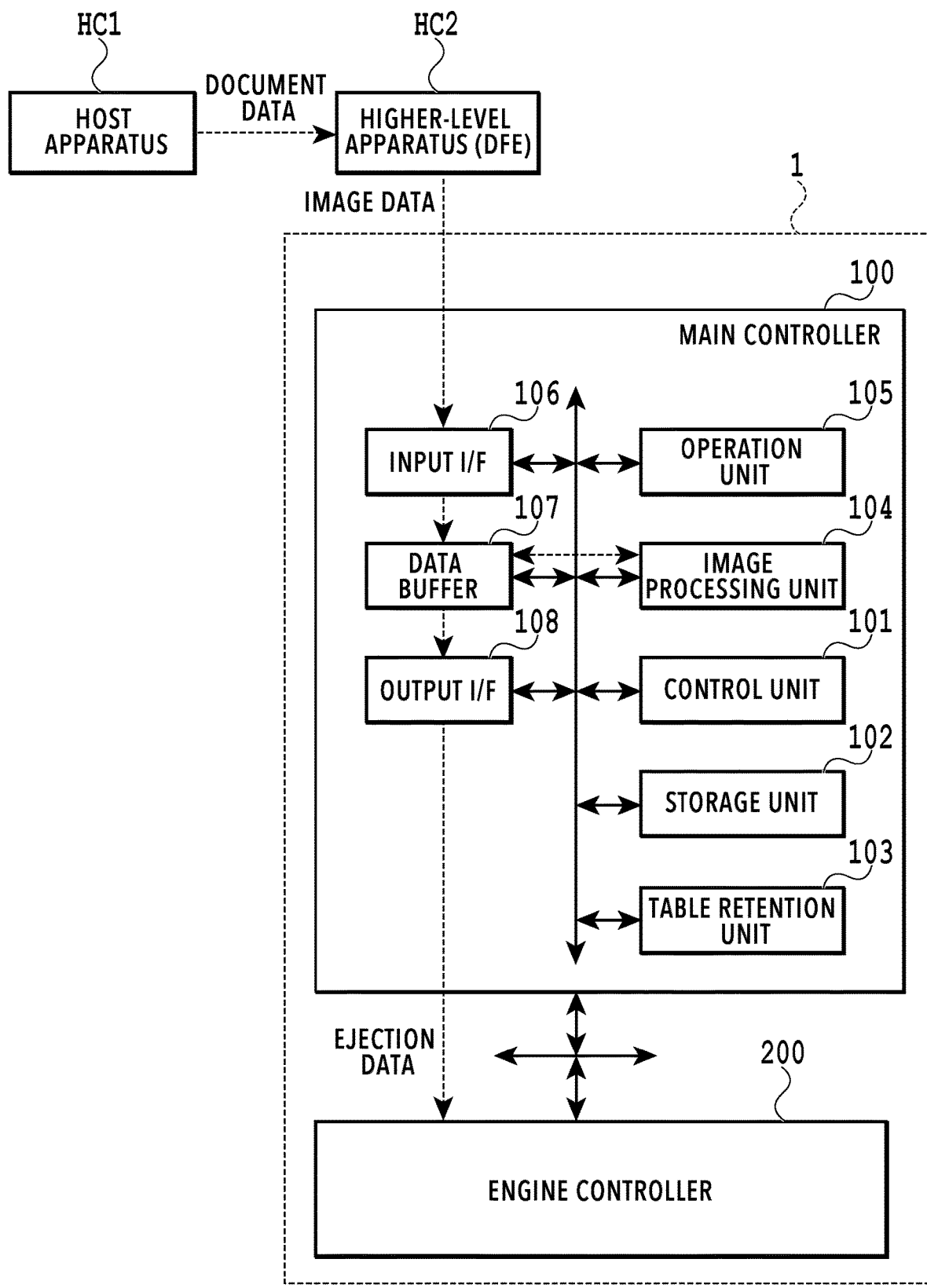
FIG. 4 is a block diagram for explaining a control configuration of the image printing apparatus.

FIG. 4 is a block diagram for explaining a control configuration of the image printing apparatus 1. The image printing apparatus 1 is communicably connected to a higher-level apparatus (DFE) HC2. The higher-level apparatus HC2 is communicably connected to a host apparatus HC1.

In the host apparatus HC1, document data to be the basis of a print image is generated or stored. The document data is generated in an electronic file format such as a document file or an image file. The document data is transmitted to the higher-level apparatus HC2. In the higher-level apparatus HC2, the received document data is converted into a data format usable in the image printing apparatus 1 (such as RGB data representing an image in RGB). The converted data is transmitted as image data from the higher-level apparatus HC2 to the image printing apparatus 1. The image printing apparatus 1 performs print operation based on the received image data.

The control configuration of the image printing apparatus 1 is roughly classified into a main controller 100 and an engine controller 200. The main controller 100 comprises a control unit 101, a storage unit 102, a table retention unit 103, an image processing unit 104, an operation unit 105, an input I/F (interface) 106, a data buffer 107, and an output I/F 108.

The control unit 101 is a processor such as a CPU. The control unit 101 controls the entire main controller 100 according to a program stored in the storage unit 102. The storage unit 102 is a storage device such as a ROM, hard disk, or SSD, and stores data and a program executed by the control unit 101. The table retention unit 103 includes, for example, a RAM, and rewritably retains a destination designation table to be described later. The operation unit 105 is an input device such as a touch panel, keyboard, or mouse, and is a display input unit configured to provide a user of information and accept a user instruction.

The image processing unit 104 is, for example, an electronic circuit comprising an image processor. The data buffer 107 is a memory area that temporarily stores image data input from the higher-level apparatus HC2 and image data being processed by the image processing unit 104 and is, for example, a RAM, hard disk, or SSD. The input I/F 106 communicates with the higher-level apparatus HC2. The output I/F 108 communicates with the engine controller 13B.

In FIG. 4, dashed arrows indicate the flow of image data processing. Image data received from the higher-level apparatus HC2 via the input I/F 106 is accumulated in the data buffer 107. Under an instruction from the control unit 101, the image processing unit 104 applies predetermined image processing to the image data stored in the data buffer 107 according to the program stored in the storage unit 102 and then stores the image data in the data buffer 107 again. The image data after the image processing stored in the data buffer 107 is transmitted from the output I/F 108 to the engine controller 200 as ejection data (print data) used by the engine controller 200.

Figure 5:
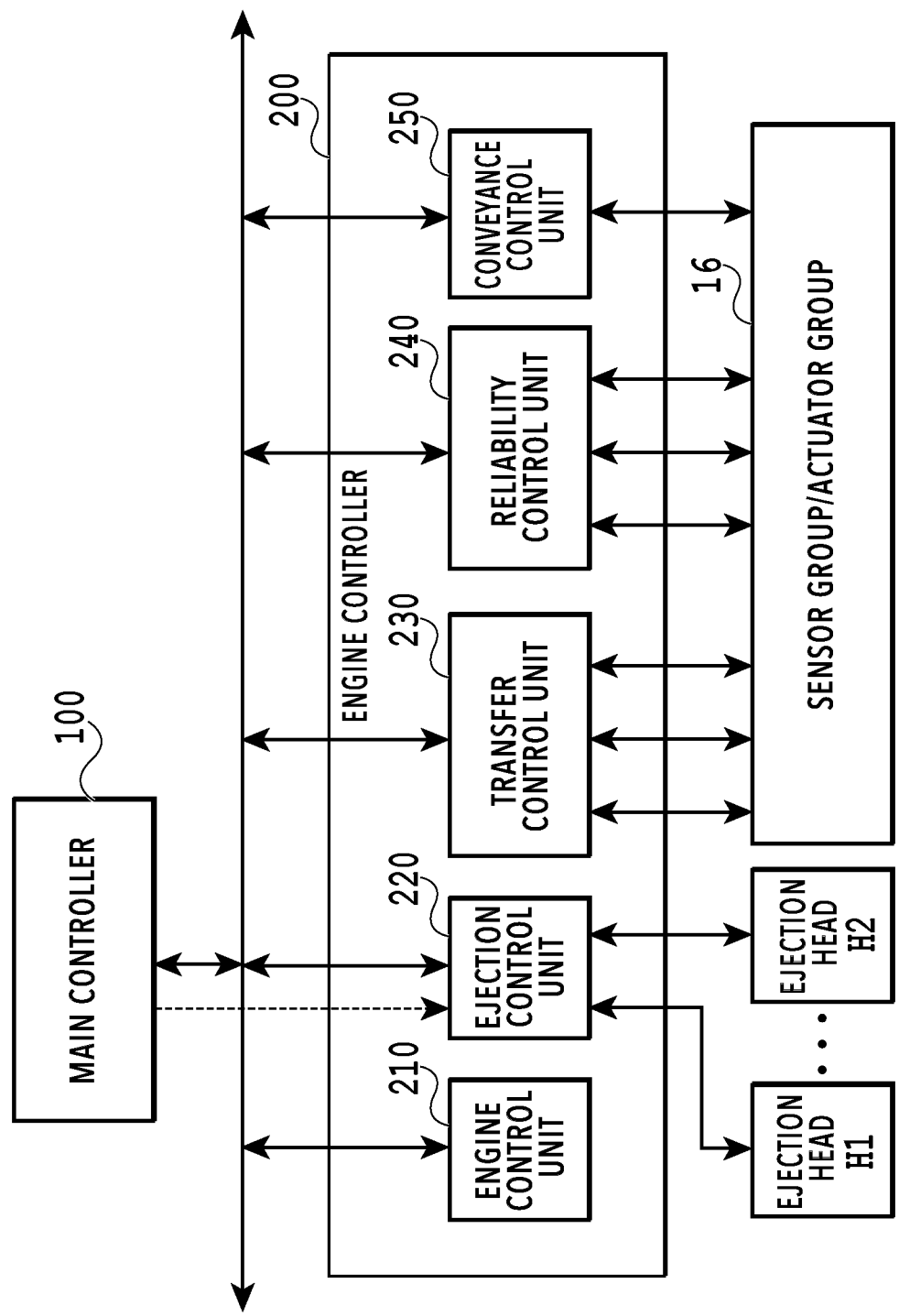
FIG. 5 is a block diagram for explaining a control configuration in an engine controller.

FIG. 5 is a block diagram for explaining a control configuration in the engine controller 200. An engine control unit 210 controls the entire engine controller 200. An ejection control unit 220 converts the ejection data received from the main controller 100 into a data format suitable for driving the print head 30 such as raster data, manages the data in association with each of the print heads H, and drives each of the print heads H.

A transfer control unit 230 rotates the transfer cylinder 41 and the impression cylinder 42 and controls the peripheral units 5A to 5D. A reliability control unit 240 moves the print unit 3 in the Y direction and controls the recovery unit 10. A conveyance control unit 250 has control over conveyance in the conveying unit 11. That is, the conveyance control unit 250 controls the conveying rollers 9, the sheet feeding unit 7, and the sheet collection unit 8. In a sensor group/actuator group 16, the sensor group includes a sensor that detects the position and speed of a movable unit, a sensor that detects a temperature, and an image capturing element. The actuator group includes a motor, an electromagnetic solenoid, and an electromagnetic valve.

Each of the control units 210 to 250 shown in FIG. 5 includes a processor such as a CPU, a storage device such as a RAM or ROM, and an interface with an external device. The classification of the control units 210 to 250 is just an example. Some control units may be further classified into control units or may be integrated into a single control unit.

Figure 6:
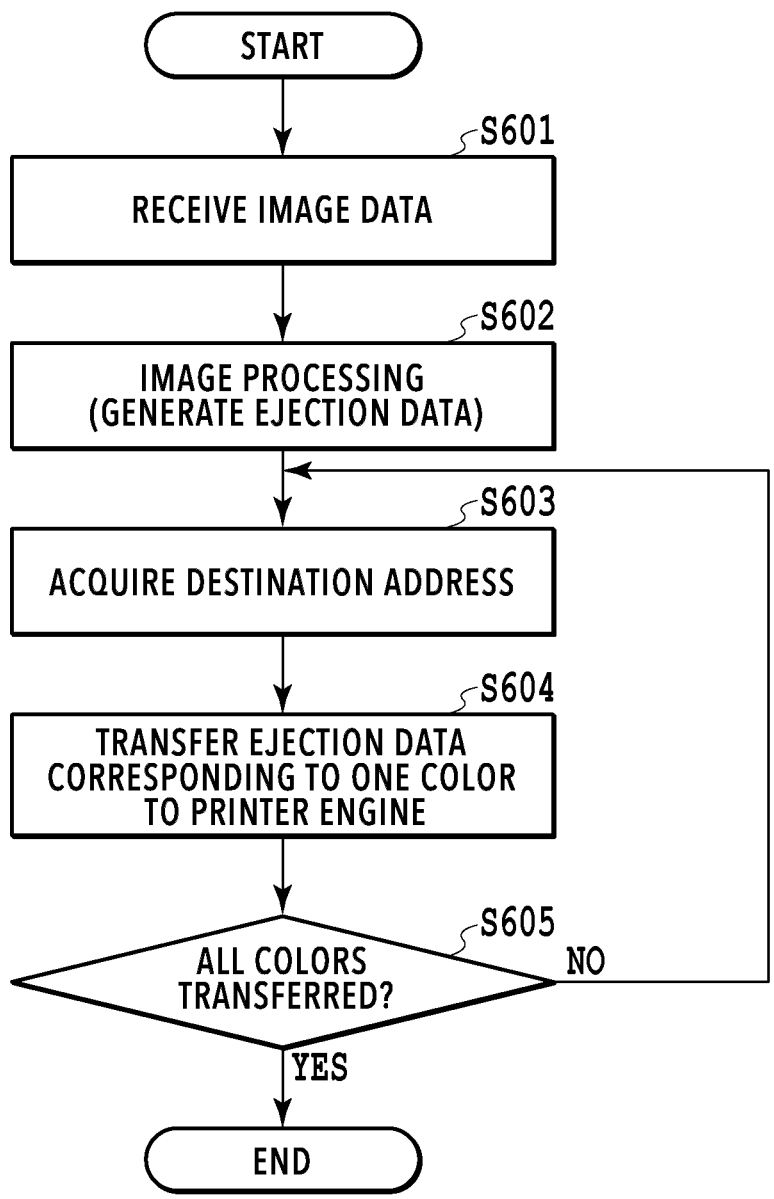
FIG. 6 is a flowchart executed by a control unit in the occurrence of a print command.

FIG. 6 is a flowchart for explaining processing executed by the control unit 101 of the main controller 100 shown in FIG. 4 using each mechanism in the occurrence of a print command. Each step shown in FIG. 6 will be described below with reference to FIG. 4.

In the occurrence of a print command, in S601, the control unit 101 receives image data from the higher-level apparatus HC2 via the input I/F 106 and stores the image data in the data buffer 107.

In S602, under an instruction from the control unit 101, the image processing unit 104 applies predetermined image processing to the image data stored in the data buffer 107 according to a program stored in the storage unit 102 and generates ejection data that enables ejection by each print head H. The generated ejection data is stored in the data buffer 107. The ejection data is generated for each of the inks and stored in the buffer 107 in association with each ink.

In S603, the control unit 101 refers to a destination designation table stored in the table retention unit 103. In the present embodiment, the destination designation table is a table associating inks with destination addresses. The control unit 101 refers to the destination designation table and acquires a destination address of ejection data corresponding to an ink of interest.

In S604, the control unit 101 transfers ejection data corresponding to the ink of interest out of an ejection data group stored in the buffer 107 to a channel mapped to the address in the engine controller 200 acquired in S603.

In S605, the control unit 101 determines whether the transfer of ejection data corresponding to all the inks stored in the buffer 107 has been completed. If there is untransferred ejection data, the processing returns to S603. The control unit 101 refers to the destination designation table again, acquires a destination address of ejection data corresponding to the next ink of interest, and transfers the ejection data corresponding to the next ink of interest to the address in the engine controller 200 acquired in S603.

The control unit 101 repeats referring to the destination address (S603) and transferring the ejection data according to the referred address (S604) as described above until it is determined in S605 that the transfer of ejection data corresponding to all the inks has been completed. If it is determined in S605 that the transfer of ejection data corresponding to all the inks has been completed, the processing is finished.

Figure 7:
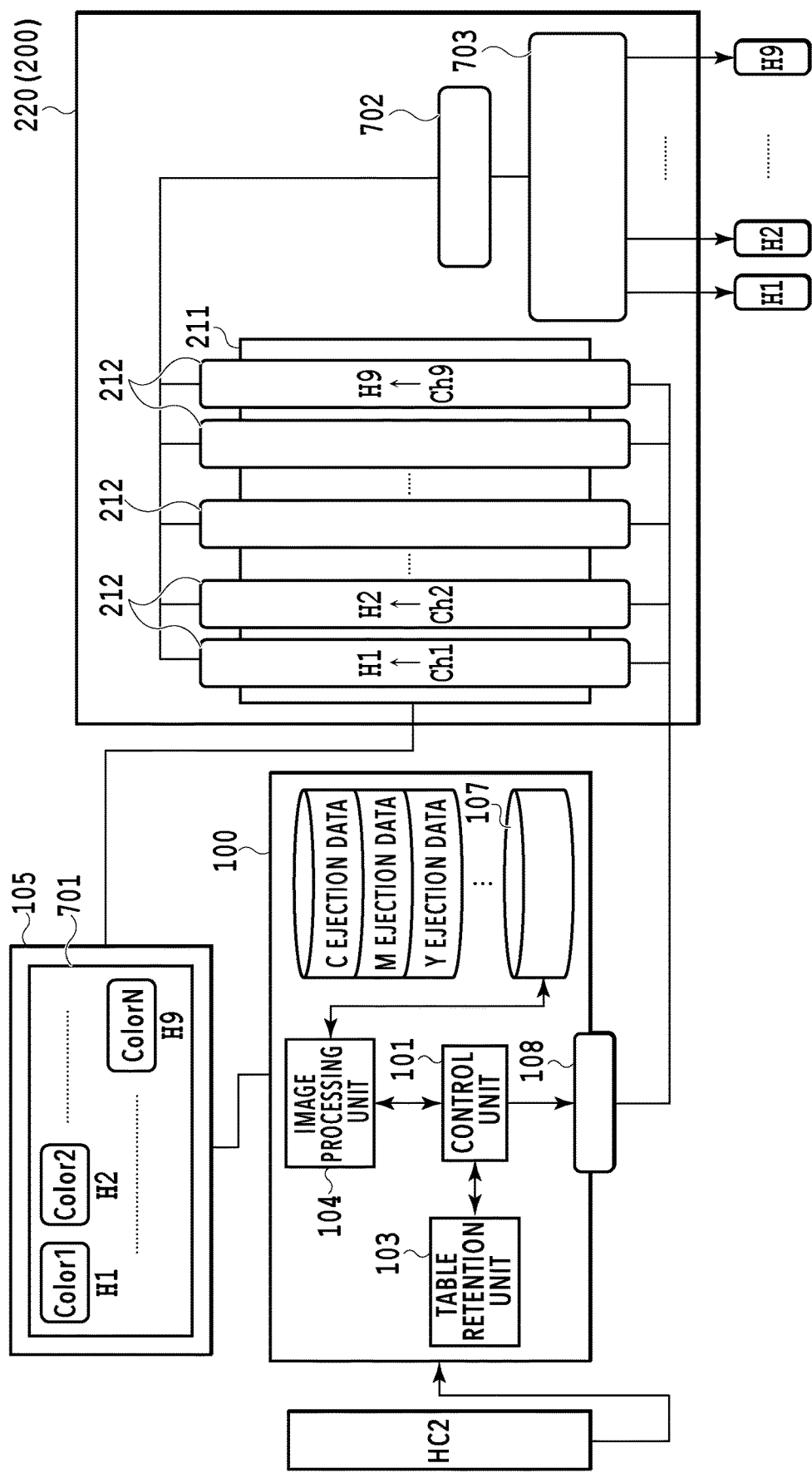
FIG. 7 is a schematic diagram for explaining a configuration of transferring ejection data on each ink.

FIG. 7 is a schematic diagram for explaining the configuration of transferring ejection data on each ink from the main controller 100 to the engine controller 200.

The image data input from the higher-level apparatus HC2 to the main controller 100 is subjected to predetermined image processing by the image processing unit 104 and converted into ejection data in which ink ejection or non-ejection is determined for each pixel. The ejection data is generated for each ink used by the image printing apparatus 1 and stored in the data buffer 107. At this time, the order of storage of ejection data in the data buffer 107 does not necessarily correspond to the order of the array of the print heads in the print unit 3.

A user can confirm and set inks to be ejected by the respective print heads H1 to H9 mounted on the image printing apparatus 1 using a user interface 701 (hereinafter referred to as a UI 701) of the operation unit 105. This UI 701 functioning as a display input unit may be a combination of a touch panel and a button or may be a command interface.

Information confirmed or set by the user via the UI 701 is reflected on the destination designation table stored in the table retention unit 103 of the main controller 100. In the destination designation table, inks actually ejected by the respective print heads H1 to H9 and destination addresses of ejection data for allowing the respective print heads H1 to H9 to perform ejection operation are stored in association with each other. In short, the control unit 101 displays the destination designation table stored in the table retention unit 103 on the UI 701 and updates the destination designation table based on information received from the UI 701.

The UI 701 may display various contents and accept various user instructions. For example, a table indicating the association among ink colors, addresses, and channels corresponding to the destination designation table may be displayed as the UI 701 such that a user can instruct a change of the association. Alternatively, the order of execution of ejection operation corresponding to respective ink colors may be displayed as the UI 701 such that a user can change the order. For example, ink color information "C, M, Y, . . . " is displayed on the UI 701 and a user changes the order to a desired printing order of ink colors using the operation unit 105.

The control unit 101 receives such a user instruction from the UI 701 and determines the order of colors according to the instruction. The control unit 101 updates the destination designation table such that the print heads H1 to H9 perform ink ejection operation in the determined order based on data corresponding to the respective colors.

The ejection control unit 220 (see FIG. 5) of the engine controller 200 comprises an ejection data conversion unit 211, a drive signal generation unit 702, and a head drive unit 703. The ejection data conversion unit 211 comprises a plurality of channel buffers Ch1 to Ch9 corresponding to the respective print heads H1 to H9 mounted on the print unit 3. In this specification, a channel indicates an entire control unit prepared for each of the print heads H1 to H9, and specifically includes the channel buffer, the drive signal generation unit 702, and the head drive unit 703.

A destination address stored in the destination designation table is an address for mapping each of the channel buffers Ch1 to Ch9. The control unit 101 transfers ejection data on each ink according to the destination address stored in the destination designation table. Thus, ejection data on each ink stored in the data buffer 107 is transferred to any one of the channel buffers Ch1 to Ch9 for a print head H that ejects the corresponding ink.

The drive signal generation unit 702 generates a drive signal for each channel based on ejection data stored in each of the channel buffers Ch1 to Ch9. According to the drive signal generated by the drive signal generation unit 702, the head drive unit 703 drives a corresponding ejection element of a corresponding print head H at a predetermined timing.

Examples of information managed in the destination designation table and the status of data transfer based on the information will be specifically described as embodiments.

First Embodiment

Figures 8A, 8B:
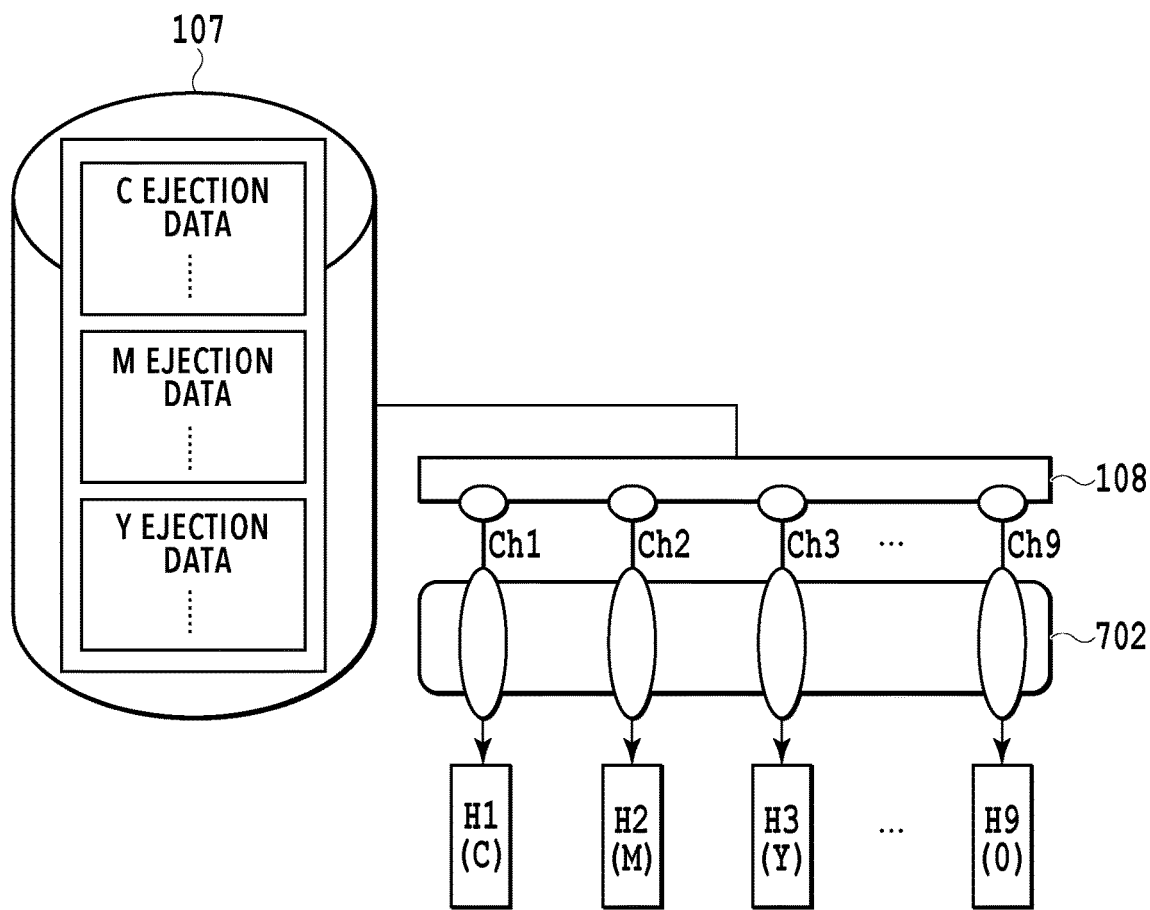
FIGS. 8A and 8B are diagrams showing the association between ejection data and channels in a first embodiment.

FIGS. 8A and 8B are diagrams showing the association between the ejection data stored in the data buffer 107 and the channels in the present embodiment. FIG. 8A is a schematic diagram showing a connection relationship between the data buffer 107 and the channels. FIG. 8B shows an example of the destination designation table retained in the table retention unit 103 of the main controller 100.

In the data buffer 107, the ejection data generated by the image processing unit 104 is retained in association with ink information. The output I/F 108 and the drive signal generation unit 702 are connected via the channel buffers Ch1 to Ch9. The channel buffers Ch1 to Ch9 are associated with the print heads H1 to H9 one by one. That is, ejection data received by the channel buffer Ch1 is converted into a drive signal by the drive signal generation unit 702 and then used for ejection by the print head H1. Ejection data received by the channel buffer Ch2 is converted into a drive signal by the drive signal generation unit 702 and then used for ejection by the print head H2.

In the destination designation table shown in FIG. 8B, ink information (Color) and destination address information (Address) are stored in association with each other. The address information corresponds to information designating one of the channel buffers Ch1 to Ch9. That is, in the case of FIG. 8B, ejection data corresponding to the cyan ink (C) is designated to be transmitted to the channel buffer Ch1 mapped to address 0x0000. Ejection data corresponding to the magenta ink (M) is designated to be transmitted to the channel buffer Ch2 mapped to address 0x0005. Ejection data corresponding to the yellow ink (Y) is designated to be transmitted to the channel buffer Ch3 mapped to address 0x0010.

Accordingly, in a case where the destination designation table is as shown in FIG. 8B, the ejection data on the cyan ink is used for ejection by the print head H1 via the channel buffer Ch1. The ejection data on the magenta ink is used for ejection by the print head H2 via the channel buffer Ch2. The ejection data on the yellow ink is used for ejection by the print head H3 via the channel buffer Ch3. As described above, in the destination designation table, it is required that the ink information (C, M, Y) used for ejection by the print heads H1, H2, and H3 is stored in appropriate association with the channels Ch1, Ch2, and Ch3 corresponding to the print heads H1, H2, and H3. In the drawings, the order of storage of the ejection data in the data buffer 107 (C, M, Y) is the same as the order of array of the ink information in the destination designation table (C, M, Y). However, they are not necessarily the same as a matter of course.

Second Embodiment

Figures 9A, 9B:
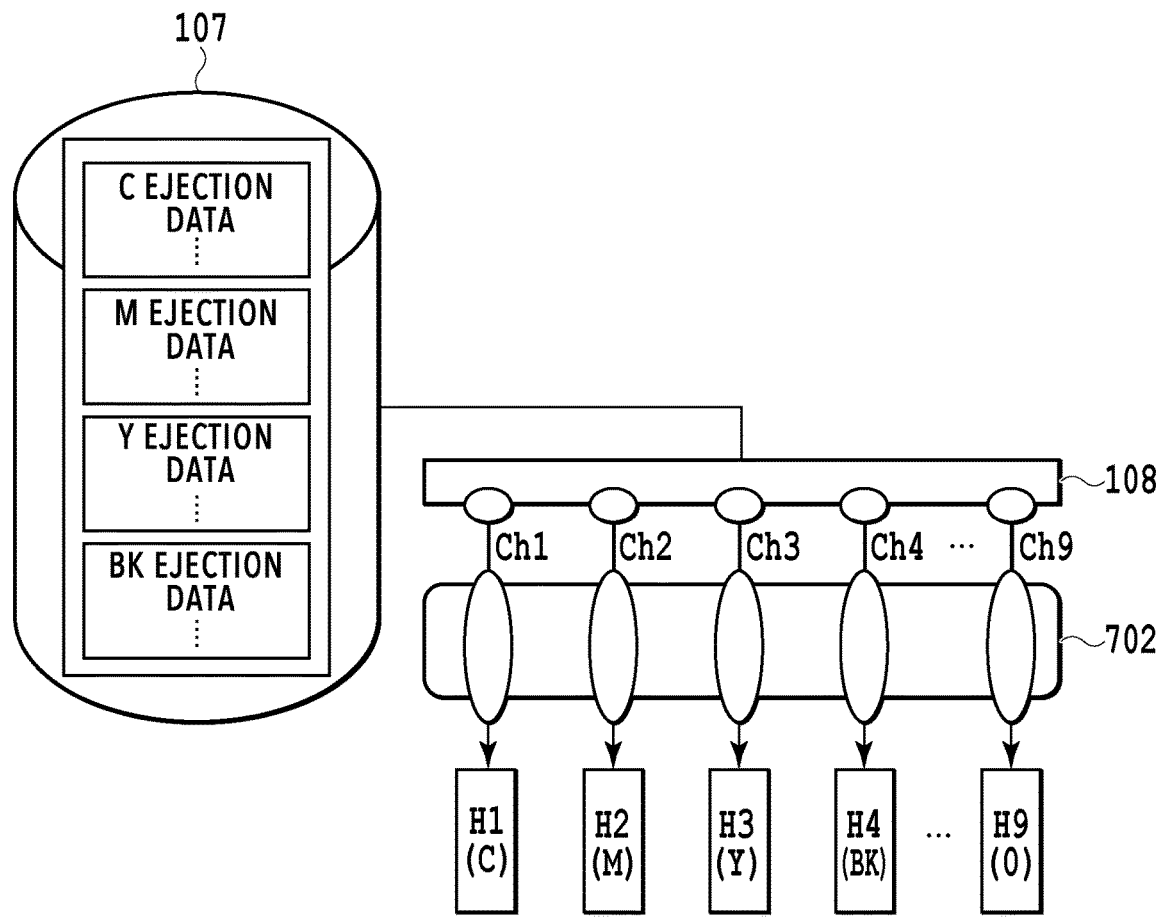
FIGS. 9A and 9B are diagrams showing the association between ejection data and channels in a second embodiment.

FIGS. 9A and 9B show the case where a print head H4 is added as a print head for black (BK) to the first embodiment shown in FIGS. 8A and 8B. In the data buffer 107, ejection data corresponding to the four colors, C, M, Y, and BK, generated by the image processing unit 104 is stored in association with the ink information.

In the destination designation table of the present embodiment shown in FIG. 9B, an ink color BK is added to C, M, and Y. The same address information as FIG. 8B is associated with C, M, and Y. Address information (0X00015) different from C, M, and Y is associated with newly added BK. That is, ejection data corresponding to the ink BK is designated to be transmitted to the channel buffer Ch4 mapped to address 0x0015.

Based on the settings shown in FIG. 9B, the ejection data on the cyan ink, magenta ink, yellow ink, and black ink is used for ejection by the print heads H1, H2, H3, and H4 via the channel buffers Ch1, Ch2, Ch3, and Ch4, respectively. That is, the control unit 101 (see FIG. 4) refers to the destination designation table shown in FIG. 9B, thereby appropriately transferring ejection data corresponding to each ink stored in the data buffer 107 to a print head H which eject the ink.

Third Embodiment

Figures 10A, 10B:
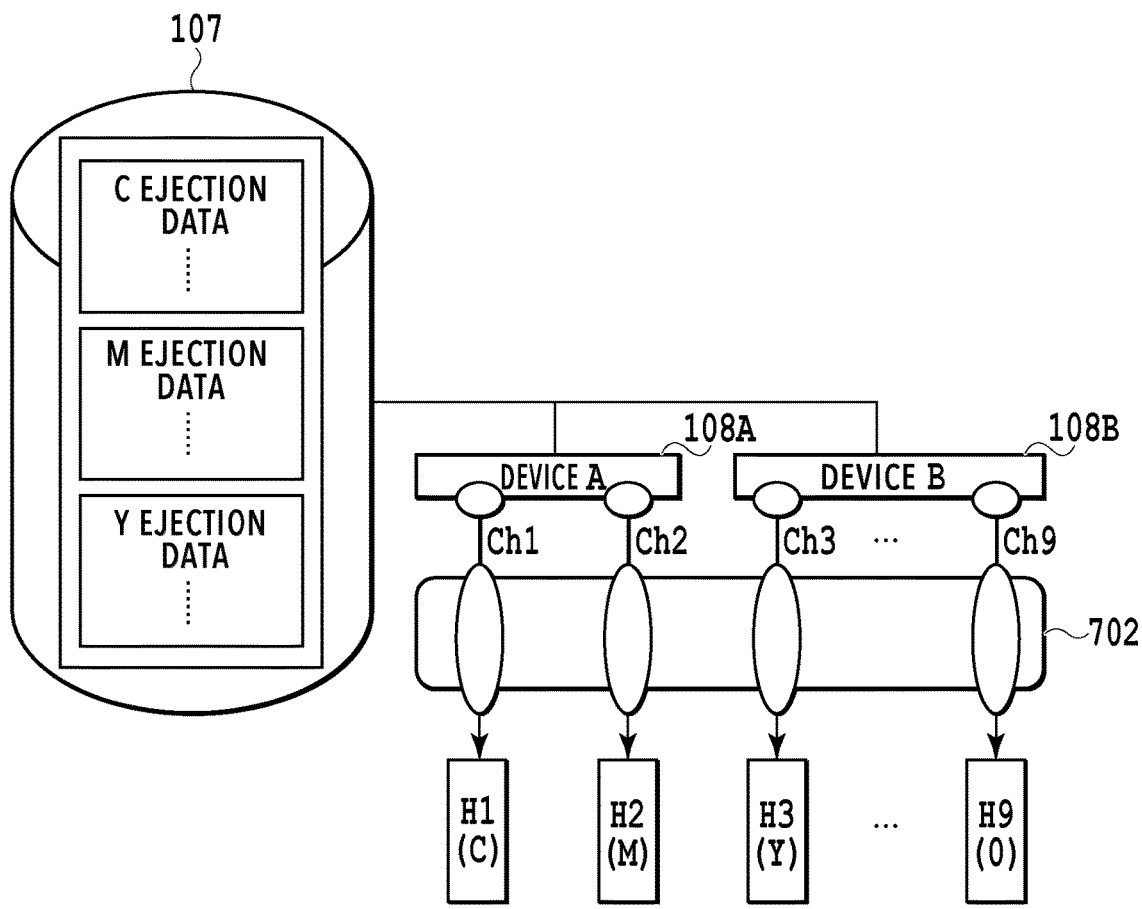
FIGS. 10A and 10B are diagrams showing the association between ejection data and channels in a third embodiment.

FIGS. 10A and 10B show the case where two output I/Fs 108 are provided in the first embodiment shown in FIGS. 8A and 8B. More specifically, the channel buffers Ch1 and Ch2 are connected to an output I/F 108A (device A) and the channel buffers Ch3 to Ch9 are connected to an output I/F 108B (device B).

Therefore, in the destination designation table of the present embodiment shown in FIG. 10B, interface device information (Device) used for transfer is also stored in addition to the destination address information. That is, the control unit 101 (FIG. 4) transfers ejection data corresponding to each ink to a designated address via a device designated in the destination designation table. In the case of the settings shown in FIG. 10B, the control unit 101 transmits ejection data on cyan (C) stored in the data buffer 107 to the channel buffer Ch1 mapped to address 0x0000 via the output I/F 108A (device A). The control unit 101 transmits ejection data on magenta (M) to the channel buffer Ch2 mapped to address 0x0005 via the output I/F 108A (device A). The control unit 101 transmits ejection data on yellow (Y) to the channel buffer Ch3 mapped to address 0x0010 via the output I/F 108B (device B).

As described above, according to the present embodiment, in a case where there are a plurality of I/F devices for data output, output I/F devices to be used are set in association with destination addresses in the destination designation table. This enables appropriate transfer of ejection data on each ink to a corresponding print head H.

Fourth Embodiment

In the image printing apparatus 1 of the present embodiment, the types of inks supplied to the print heads H1 to H9 can be changed according to situations. In addition, the association in the destination designation table is rewritable according to the change.

Figure 11:
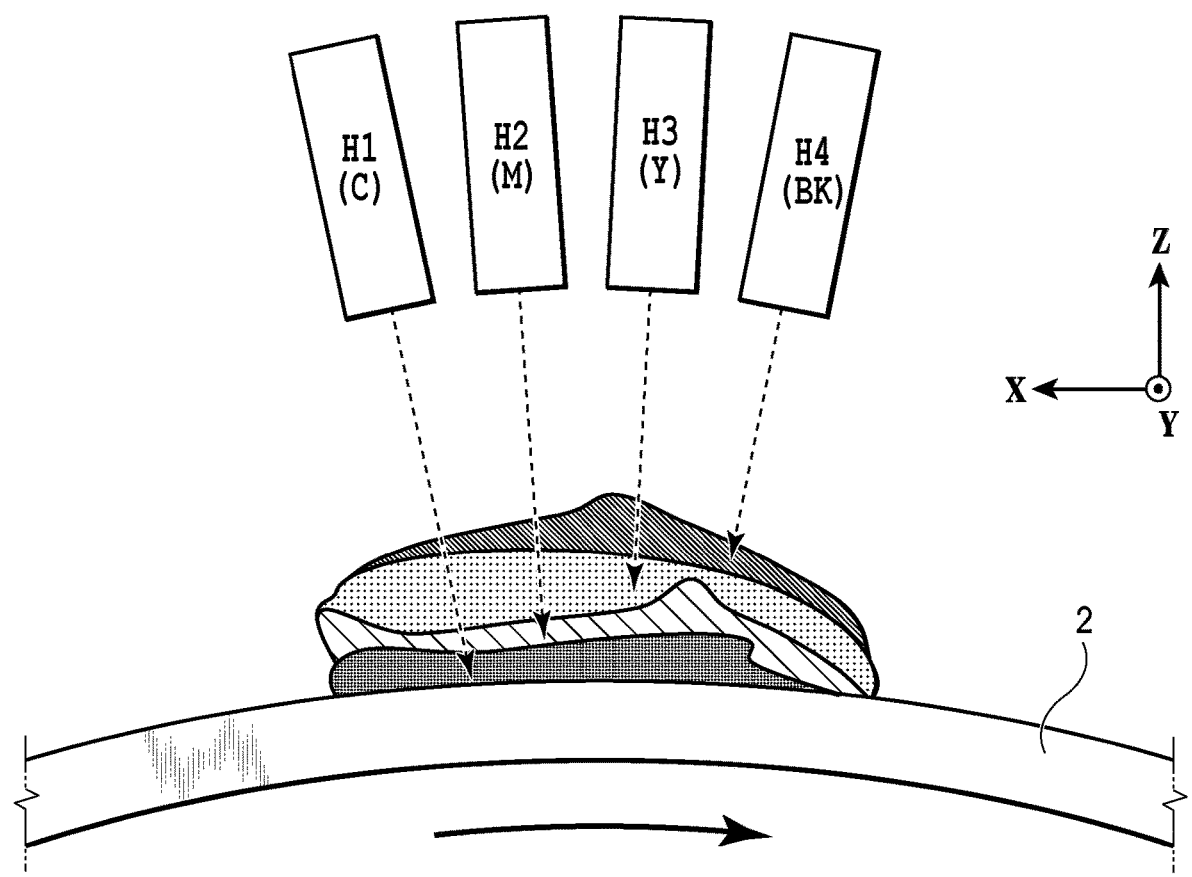
FIG. 11 is a diagram showing the order of putting inks on a transfer body.

FIG. 11 is a diagram showing the relationship between the inks ejected by the four print heads H1 to H4 and the order of putting the inks on the transfer body 2. FIG. 11 shows the case where the print head H1 ejects the cyan ink (C), the print head H2 ejects the magenta ink (M), the print head H3 ejects yellow the ink (Y), and the print head H4 ejects the black ink (BK). In this case, an ink image in which the inks are layered in the order of cyan (C), magenta (M), yellow (Y), and black (BK) is formed on the surface of the transfer body 2 rotating clockwise in the drawing. Accordingly, in the print product P' to which the ink image is transferred, an image in which the inks are layered in reverse order, that is, the order of black (BK), yellow (Y), magenta (M), and cyan (C) can be obtained.

The color development of the print product P' depends on reflected light on the surface of the print product P'. Thus, the color development in the uppermost ink layer tends to be strong and the color development in the lowermost ink layer tends to be weak. That is, in a case where the print heads H1 to H4 eject the inks shown in FIGS. 12A and 12B, the cyan layer ejected by the print head H1 is located in the uppermost layer on the print medium P, whereby the print product P' having high color development of cyan can be obtained. In a case where the order of ink colors ejected by the print heads H1 to H4 shown in FIG. 11 is reversed, the black layer ejected by the print head H1 is located in the uppermost layer on the print medium P, whereby the print product P' having high color development of black can be obtained.

Some inks may chemically react with a contacted ink layer and change their properties. Further, there is a case where a reactive ink is used so as to enhance properties such as fixability and gloss. That is, even if the same inks are combined, the color development of the print product P' differs according to which of the print heads H ejects each ink. Therefore, it is preferable to adjust an ink to be ejected by each print head H so as to obtain desired color development.

On the other hand, in the image printing apparatus 1, the types and number of inks suitable for use are different according to various uses, for example, whether an output image is full color or mono color, or is a photo image or a text image.

Accordingly, in the image printing apparatus 1 of the present embodiment, the types, number, order of application, and the like of inks in use are optimized according to the use of an image and the like, and the inks to be supplied to the respective print heads H can be changed such that the inks are applied in the optimized order. That is, the association between the print heads H and the inks to be supplied to the respective print heads can be set individually for each image printing apparatus and can be changed in the same apparatus at the time of maintenance or the like. Therefore, in the image printing apparatus 1 of the present embodiment, it is required that the content of the destination designation table is appropriately set or updated based on the types and order of application of inks in use.

Figures 12A, 12B:
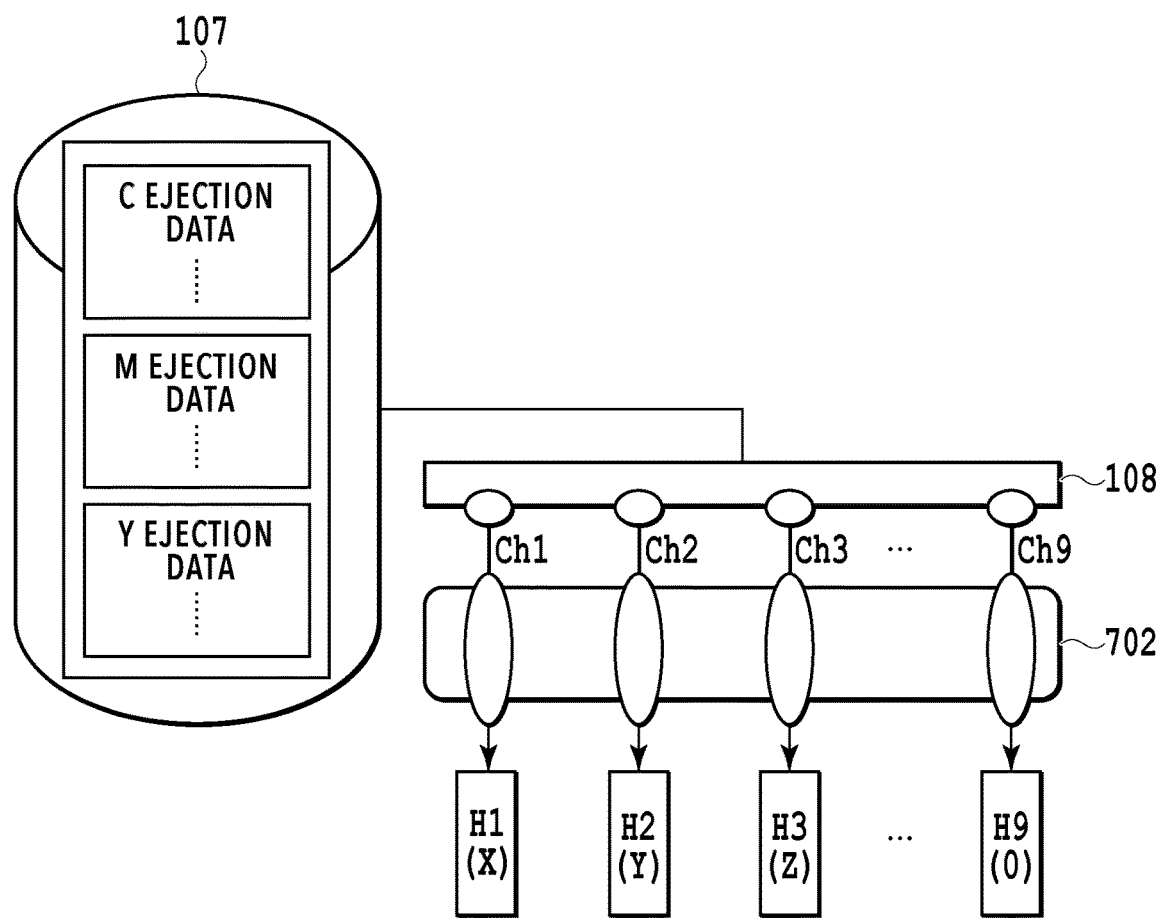
FIGS. 12A and 12B are diagrams showing the association between ejection data and channels in a fourth embodiment.

FIGS. 12A and 12B are diagrams showing the destination designation table in the present embodiment and the association between the ejection data and the channels based on the destination designation table.

In the destination designation table shown in FIG. 12B, the channel buffers Ch1 to Ch9 and the destination address information (Address) are fixed association information. In contrast, ink color information X, Y, Z is information rewritable by the control unit 101 according to a user instruction input to the operation unit 105. A user can set or update the color information in the destination designation table via the UI 701 in the case of changing the types of inks to be ejected from the respective print heads H1 to H9 for example, at the time of arrival of the image printing apparatus 1 or in response to a change of the use of an output image.

FIGS. 13A and 13B are diagrams showing a situation where the settings in the UI 701 are reflected on the destination designation table. As shown in FIG. 13A, the screen of the UI 701 displays the association between the ink colors and the print heads H1 to H9 mounted on the carriage 31 of the image printing apparatus 1. A user can select an ink color to be ejected by the print head H1 from among a plurality of ink colors such as cyan, magenta, and yellow, and sets the color as Color1. The same applies to Color2 and subsequent colors. At this time, in a case where none of the inks is ejected, the option "disuse" may be set.

The control unit 101 acquires the information via the UI 701 and updates the destination designation table stored in the table retention unit 103. That is, in a case where cyan is set as Color1 corresponding to the print head H1 in the UI 701, cyan (C) is set in the field of Color1 of the color information in the destination designation table. In a case where magenta is set as Color2 corresponding to the print head H2, magenta (M) is set in the field of Color2 of the color information in the destination designation table. In a case where yellow is set as Color3 corresponding to the print head H3, yellow (Y) is set in the field of Color3 of the color information in the destination designation table.

In short, in the destination designation table shown in FIG. 13B, ink information Color1 to ink information Color9 are rewritable parameters. A user can update the parameters in the destination designation table via the UI 701 based on the inks to be supplied to the print heads H1 to H9 mounted on the image printing apparatus 1. That is, the control unit 101 (see FIG. 4) can appropriately transfer ejection data corresponding to each ink stored in the data buffer 107 to a print head H that ejects the ink by referring to the destination designation table shown in FIG. 13B.

In the present embodiment, the content to be stored in the destination designation table is acquired using the user interface 701 (UI 701). However, the use of the UI 701 is not an essential requirement. For example, the control unit 101 can automatically determine whether each of the inks of the print heads H1 to H9 is used for ejection operation, and if the ink is used, determine which ink is ejected, using a sensor or the like provided in the apparatus body. In this case, the control unit 101 may rewrite the content of the destination designation table based on the result of determination.

As described above, according to the present embodiment, even in a case where the number and arrangement of print heads are variously changed, the print data and the channels can be associated with each other with a simple configuration and the print data can be transferred to an appropriate print head.

Other Embodiments

In the above embodiments of the image printing apparatus, the ink image is formed by the print heads H on the transfer body and transferred from the transfer body 2 to the print medium, whereby the print product P' is obtained. However, the embodiments are also applicable to the case where the print heads eject ink directly on the print medium.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-147535 filed Aug. 9, 2019, which is hereby incorporated by reference wherein in its entirety.

What is claimed is:

1. An image processing apparatus configured to perform image processing for printing an image, the image processing apparatus comprising:
- a plurality of print heads including (a) a first print head on which a plurality of ejection openings are provided and (b) a second print head on which a plurality of ejection openings are provided, the first print head and the second print head being arranged so that the first print head performs ejecting before the second print head;
- a data buffer configured to store print data;
- a storage configured to store table data including (a) a first address of a first channel buffer that receives print data to be used for driving the first print head, (b) a second address of a second channel buffer that receives print data to be used for driving the second print head, (c) first ink information indicating a first color ink, and (d) second ink information indicating a second color ink different from the first color ink; and
- at least one processor causing the image processing apparatus to:
 (1) cause the data buffer to store (a) first print data for the first color ink and (b) second print data for the second color ink; and
 (2) transfer the first print data stored in the data buffer and the second print data stored in the data buffer based on the table data,
- wherein, in a case where an ink setting has been performed so that the first color ink is ejected by the first print head and the second color ink is ejected by the second print head, the first address is associated with the first ink information and the second address is associated with the second ink information in the table data, whereby the first print data is transmitted to the first address and the second print data is transmitted to the second address based on the table data, and
- wherein, in a case where the ink setting is changed by a user so that a third color ink different from the first color ink is ejected by the first print head, the table data is rewritten so that the first address is associated with third ink information indicating the third color ink, whereby third print data for the third color ink is transmitted to the first address based on the rewritten table data.

2. The image processing apparatus according to claim 1, wherein the at least one processor further causes the image processing apparatus to accept an instruction from the user about the change of the ink setting, and
- wherein the rewriting of the table data is performed in accordance with the instruction.

3. The image processing apparatus according to claim 1, wherein the storage further stores interface device information for transferring data to addresses of the channel buffers assoicated with respective print heads, in association with the addresses.

4. The image processing apparatus according to claim 1, wherein the at least one processor causes each of the plurality of print heads to eject ink by driving each of the plurality of print heads according to print data transferred to a corresponding channel buffer.

5. The image processing apparatus according to claim 1, wherein the at least one processor causes the image processing apparatus to generate print data corresponding to each ink based on image data.

6. An image printing apparatus comprising:
- a plurality of print heads including (a) a first print head on which a plurality of ejection openings are provided and (b) a second print head on which a plurality of ejection openings are provided, the first print head and the second print head being arranged so that the first print head performs ejecting before the second print head;
- a data buffer configured to store print data;
- a storage configured to store table data including (a) a first address of a first channel buffer that receives print data to be used for driving the first print head, (b) a second address of a second channel buffer that receives print data to be used for driving the second print head, (c) first ink information indicating a first color ink, and (d) second ink information indicating a second color ink different from the first color ink; and
- at least one processor causing the image printing apparatus to:
 (1) cause the data buffer to store (a) first print data for the first color ink and (b) second print data for the second color ink;
 (2) transfer the first print data stored in the data buffer and the second print data stored in the data buffer based on the table data; and
 (3) cause each of the plurality of print heads to eject ink by driving each of the plurality of print heads according to print data transferred to a corresponding channel buffer,
- wherein, in a case where an ink setting has been performed so that the first color ink is ejected by the first print head and the second color ink is ejected by the second print head, the first address is associated with the first ink information and the second address is associated with the second ink information in the table data, whereby the first print data is transmitted to the first address and the second print data is transmitted to the second address based on the table data, and
- wherein, in a case where the ink setting is changed by a user so that a third color ink different from the first color ink is ejected by the first print head, the table data is rewritten so that the first address is associated with third ink information indicating the third color ink, whereby third print data for the third color ink is transmitted to the first address based on the rewritten table data.

7. The image printing apparatus according to claim 6, wherein the at least one processor causes the image printing apparatus to (a) display an association between addresses and ink information in the storage, (b) accept a change of the displayed association from a user, and (c) rewrite the association between the addresses and the ink information in the storage in accordance with the accepted change.

8. The image printing apparatus according to claim 6, wherein the plurality of print heads are (a) arranged in different positions in a direction of rotation of a rotating transfer cylinder and (b) form an ink image on a transfer body provided on an outer periphery of the transfer cylinder by being driven, and
- wherein the ink image is transferred to a print medium provided around an impression cylinder by bringing the impression cylinder rotating in a reverse direction of the transfer cylinder into contact with the transfer cylinder at a nipping portion.

9. An image processing method of performing image processing for printing an image, the image processing method comprising:
- causing a data buffer to store first print data for a first color ink and second print data for a second color ink different from the first color ink, wherein a storage stores table data including (a) a first address of a first channel buffer that receives print data to be used for driving a first print head on which a plurality of ejection openings are provided, (b) a second address of a second channel buffer that receives print data to be used for driving a second print head on which a plurality of ejection openings are provided, wherein the first print head and the second print head are arranged so that the first print head performs ejecting before the second print head, (c) first ink information indicating the first color ink, and (d) second ink information indicating the second color ink; and transferring the first print data stored in the data buffer and the second print data stored in the data buffer based on the table data, wherein, in a case where an ink setting has been performed so that the first color ink is ejected by the first print head and the second color ink is ejected by the second print head, the first address is associated with the first ink information and the second address is associated with the second ink information in the table data, whereby the first print data is transmitted to the first address and the second print data is transmitted to the second address based on the table data, and wherein, in a case where the ink setting is changed by a user so that a third color ink different from the first color ink is ejected by the first print head, the table data is rewritten so that the first address is associated with third ink information indicating the third color ink, whereby third print data for the third color ink is transmitted to the first address based on the rewritten table data.

10. The image processing method according to claim 9, further comprising displaying an association between addresses and ink information in the storage and accepting a change of the displayed association from a user, wherein the association between the addresses and the ink information in the storage is rewritten according to the accepted change.

\* \* \* \* \*